US00RE36541E

United States Patent [19]

Rossi

[11] E Patent Number: Re. 36,541

[45] Reissued Date of Patent: Feb. 1, 2000

[54] DEVICE FOR SPOT WELDING OF STRUCTURES FORMED OF PRESSED SHEET METAL ELEMENTS

[75] Inventor: Cristiano Rossi, Torinese, Italy

[73] Assignee: Comau S.p.A., Turin, Italy

[21] Appl. No.: 08/820,811

[22] Filed: Mar. 28, 1997

Related U.S. Patent Documents

Reissue of:

[64] Patent No.: 5,400,943
Issued: Mar. 28, 1995
Appl. No.: 08/243,838
Filed: May 17, 1994

[30] Foreign Application Priority Data

Sep. 15, 1993 [IT] Italy ..... TO93A0675

[51] Int. Cl.[7] ..... B23K 9/007

[52] U.S. Cl. ..... 228/6.1; 228/49.1; 219/79; 219/86.24; 219/158; 29/33 P; 29/795; 29/822

[58] Field of Search ..... 228/6.1, 49.1, 228/212; 219/80, 86.24, 127, 158, 161, 79; 29/430, 464, 466, 469, 33 P, 795, 822

[56] References Cited

U.S. PATENT DOCUMENTS

| | | | |
|---|---|---|---|
| 4,162,387 | 7/1979 | De Candia | 219/161 |
| 4,256,946 | 3/1981 | De Candia | 219/158 |
| 4,441,645 | 4/1984 | Takagishi et al. | 219/80 |
| 4,795,075 | 1/1989 | Pigott et al. | 219/80 |
| 4,802,616 | 2/1989 | Naruse et al. | 228/49.1 |
| 5,044,541 | 9/1991 | Sekine et al. | 219/80 |

*Primary Examiner*—Samuel M. Heinrich
*Attorney, Agent, or Firm*—Sughrue, Mion, Zinn, Macpeak & Seas, PLLC

[57] ABSTRACT

In a welding station, particularly for motor-vehicle bodies, the elements to be welded are locked in a precise position by locking devices carried by locating gates. There are provided a number of parts of locating gates, corresponding to the number of different types of structures to be welded on which the station must operate. The gates are mounted on powered carriages which are guided longitudinally on both sides of the conveyor line to allow the pair of gates which are in the operative position to be rapidly interchanged. The elements of the structure to be welded reach the work area suspended to a hook, without being preliminarly connected to each other.

8 Claims, 10 Drawing Sheets

DEVICE FOR SPOT WELDING OF STRUCTURES FORMED OF PRESSED SHEET METAL ELEMENTS

Matter enclosed in heavy brackets [ ] appears in the original patent but forms no part of this reissue specification; matter printed in italics indicates the additions made by reissue.

The present invention relates to devices for spot welding of structures formed of pressed sheet metal elements, particularly motor-vehicle bodies, of the type comprising:

a welding station provided with programmable automatic welding means, a line for feeding the structure to be welded in sequence to the welding station, at least two pairs of locating gates provided at the welding station so as to be rapidly interchangeable at a work area, said locking gates carrying devices for clamping the elements forming the structure to be welded in the proper assembling position relative to each other, the gates of each pair being provided with clamping devices adapted to a respective type of structure to be welded, said pairs of gates being slidably mounted longitudinally of said welding station on both sides thereof, so as to be rapidly displaceable between a waiting area and said work area, the gates of each pair being also displaceable transversely of said line, when they are in the work area, between spaced apart inoperative positions and relatively close positions, in which the clamping devices are able to engage the structure which is at the work area.

The applicant has been producing for a long time welding devices having the above indicated features (see for example U.S. Pat. No. 4 256 947 and DE-A-2 810 822). Such welding systems, marketed under the trade mark "ROBOGATE" , have determined a turn-around in the technique of spot welding of motor-vehicle bodies. The Robogate system has been applied extensively by many car manufacturers around the world, due to a number of relevant advantages with respect to the previously used systems. Firstly, this system has a high degree of flexibility, i.e., it is able to operate on bodies even very different from each other, so that a same line cane used for producing different models. Secondly, the system may be adapted with relatively simple and quick operations, and hence with very low investment, to the production of a new body model. Another advantage lies in that a uniform quality is ensured on all the models of a same type on which the system operates.

The prior art according to the Robogate system contemplates that each body to be welded arrives at the welding station in a loosely preassembled condition. Indeed, upstream of the Robogate welding station, one or more "toy-tabbing" stations are provided, in which the various elements forming the body are loosely assembled together by bending coupling tabs. Such provisional coupling is naturally a loose coupling, in that it allows minor displacement of each element with respect to the adjacent elements. Just for this reason, the locating gates provided at the welding station are provided with clamping devices which engage the various parts of the body in order to lock them in the proper assembling position before that spot welding is carried out by robots provided at the station. Once a number of welding spots sufficient to give a relatively stable geometry to the body has been carried out on the body itself, the later proceeds towards further stations for completing welding, which do not require any more the use of clamping devices.

It is a primary object of the present invention to provide a welding device of the type indicated at the beginning which does not require the use of tabbing stations upstream of the welding station, for provisionally coupling the various parts of the body.

A further object of the present invention is that to provide a device of the above indicated type which is of simpler construction, less bulky and more flexible with respect to the above mentioned known devices.

In view of achieving said objects, the present invention provides a device for spot welding of structures formed of pressed sheet metal elements, particularly motor-vehicle bodies, comprising:

a welding station, provided with programmable automatic welding means, a line for feeding the structures to be welded in sequence to the welding station, at least two pairs of locating gates provided at the welding station so as to be rapidly interchangeable at a work area, said gates carrying devices for clamping the elements forming the structure to be welded in a proper assembling position relative to each other, the gates of each pair being provided with clamping devices adapted to a respective type of structure to be welded, said pairs of gates being slidably mounted longitudinally of said welding station on both sides thereof, so as to be rapidly displaceable between a waiting area and said work area, said gates of each pair being also displaceable transversely of said line when they are at the work area, between inoperative spaced apart positions and relatively close positions where said clamping devices are able to engage the structure which is at the welding station, characterised in that a) said locating gates are mounted on powered carriages which are guided along two tracks on both sides of said line, b) said lint comprises support means for supporting the various elements forming each structure to be welded in a position close to a final assembling position, with said elements being separate from each other, c) said guide tracks have separate portions at said work area which are displaceable transversely of the longitudinal direction of said line, for displacing the two locating gates which are at the work area between their inoperative spaced apart positions and their operative relatively close positions, d) said support means of said line comprises movable supporting parts, for suspending respectively two side portions of each structure to be welded, said movable parts being displaceable between a first position adapted for travel along said line, in which said side portions are close to each other, and a second position in which said side portions are spaced apart from each other and are adjacent to two locating gates arranged in their inoperative positions at the work area, so as to allow said side portions to be picked up by said clamping devices of said locating gates and then to allow the various elements forming the structure to be welded to be locked in the welding configuration following a displacement of said locating gates into their operative positions.

Due to the above indicated features, the device according to the invention provides a number of advantages. The arrangement of the locating gates on powered carriages guided along two tracks on both sides of the line avoids the use of bulky and complicated fixed supporting structures which are provided in the conventional Robogate plants in order to support and guide the locating gates. Therefore, the area of the welding station is much more free, so that the arrangement and the operation of the welding robots is made easier. Furthermore, since each locating gate is movable independently from the other gates, the pitch distance between each gate and the following gate along the line may be freely varied, which allows a great flexibility in the design and installation of the plant.

Furthermore, the device according to the invention completely eliminates the tabbing stations for loosely assembling the bodies upstream of said welding station. In a preferred embodiment, said conveying line is for instance an overhead conveyor and said support means are hook means associated with said overhead conveyor which picks up the various elements forming the body of the motor-vehicle at feeding stations upstream of the welding station, until a bunch of elements is formed which are suspended or anyhow supported by said hook means in a portion close to the final assembling position, without however being connected to each other. When said bunch of elements corresponding to a body to be welded arrives at the work area, said movable parts of the support means to said second position so as to deliver the side portions of the body to the locating gates which are in their inoperative positions at the work area. The locating gates may then go to their operative relatively close positions, so that the clamping devices mounted thereon can lock the side portions and the remaining elements forming the body in the proper assembling position, so as to allow spot welds to be carried out by the robots in a number sufficient to ensure a relatively stable geometry to the body. Once this welding operation has been performed, the conveyor line brings the welded body out of the station and carries a subsequent bunch of elements to be welded into the station.

According to a further preferred feature, said support means are also provided with cross-members which are positioned by the robots provided at the welding station with the ends of said cross-members connected to the two locating gates which are in their operative positions at the work area, so as to ensure stiffness and proper positioning of the gates while the welding operation is carried out.

Further features and advantages of the invention will become apparent from the following description with reference to the annexed drawings, given purely by way of non limiting example, in which.

Figure 1:
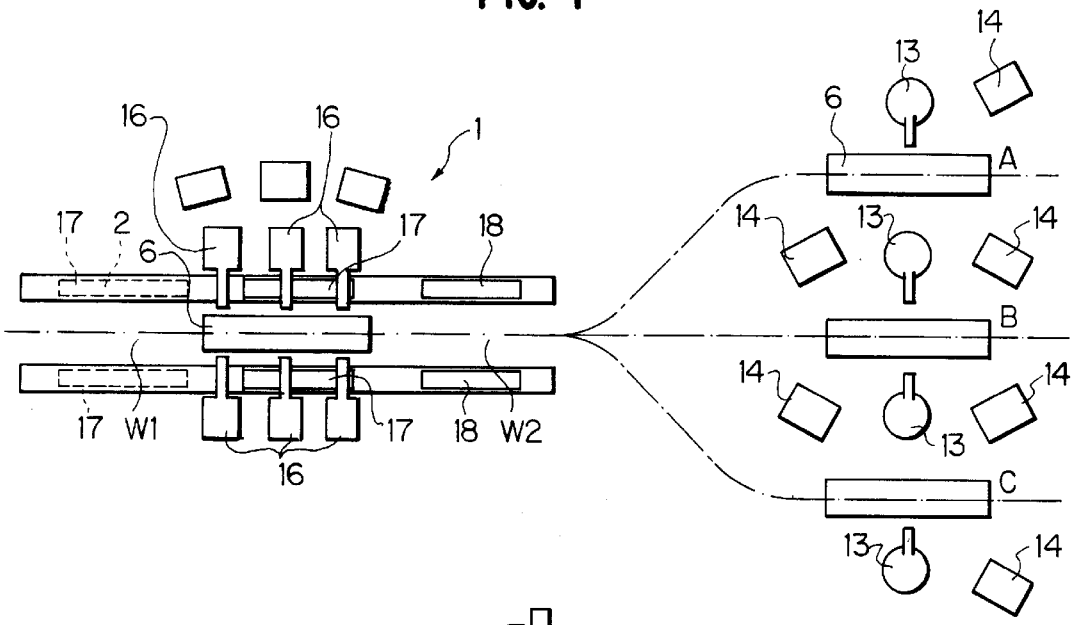
FIG. 1 is a diagrammatic plan view of a welding plant according to the invention.

FIG. 1, reference numeral 1 generally designates a welding station according to the present invention for framing motor-vehicle bodies comprised of pressed sheet metal elements by spot welding. The term "framing" refers to the operation of carrying out a number of spot welds sufficient to ensure a stable geometry to the body. Obviously, it would be possible to arrange more than one station of the type of station 1 in order to perform the framing. When such operation is completed, the bodies are caused to advance, in a way known per se, towards further stations for completing the welding, which have a much more simplified structure, since they do not require clamping devices for keeping the elements to be welded in the proper welding position.

In the case of the illustrated example, the welding station 1 is to operate on two different body models. Reference numeral 2 diagrammatically indicates a conveyor line for conveying bunches of elements forming the various bodies to be welded in sequence through the welding station 1. In the case of the illustrated example (see FIG. 2) the conveyor line 2 comprises an overhead conveyor including an overhead rail 3 on which a trolley 4 is guided which is provided with a motor reducer unit 5 which drives the movement thereof. The overhead trolley 4 carries a support structure, or "hook" 6 on which the main elements forming the body are suspended or anyhow supported, so that such elements are separate from each other, but are anyhow supported in a position close to that of final assembling. As it can be seen in FIG. 6, said elements substantially comprise a floor panel 7 and two side portions 8. As it can be seen in FIGS. 2, 5, hook 6 comprises a forward bar 9 and a rearward bar 10 which extend downwardly starting from an upper longitudinal bar 11a connected to the overhead trolley 4. Bars 9, 10 further extend downwardly with two support portion 11, 12 having reference cones 13 (FIG. 6) which engage corresponding holes formed in the floor panel 7 to support the floor panel and at the same time to position properly the floor panel once the hook 6 is at the welding area, as it will be illustrated in the following.

Still with reference to FIG. 1, the various elements forming the bunch carried by each hook 6 are picked up by the hook 6 at stations A, B, C upstream of the welding station 1. At such stations, in the preferred embodiment, manipulating robots 13 are provided which pick up the various elements from containers 14 and arrange them on hooks 6. Naturally, loading of the elements may be carried out with other automatic devices different from robots, or manually. Once the whole bunch has been loaded, each hook 6 is then brought into the welding station through conveyor lines 2a, 2b, 2c which merge into line 2, so as to form a line of bunches, corresponding to any possible sequence of bodies of the two models in question.

Figure 2:
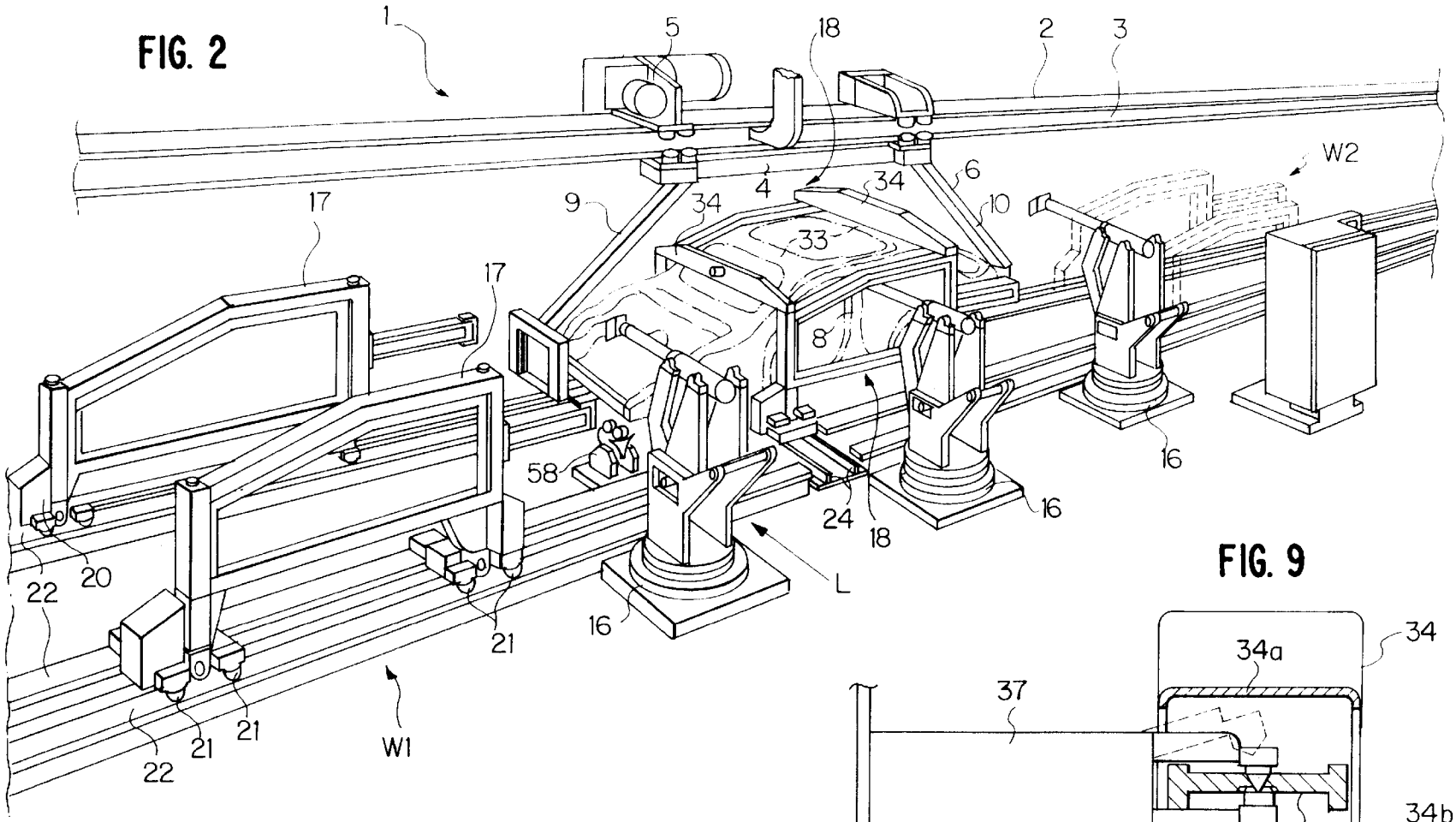
FIG. 2 is a diagrammatic perspective view of a welding device according to the invention.

Still with reference to FIGS. 1, 2, at the welding station 1, there are arranged, on both sides of line 2, welding robots 16 which are able to carry out the spot welds necessary on each body, on the basis of a program corresponding to the specific model.

In order to lock the various elements of each bunch in the correct position for final assembling, to allow the welding in station 1 to be carried out, there are provided two pairs of locating gates 17, 18. Each pair of gates 17, 18 is provided with a number of clamping devices corresponding to a respective model of body to be welded. The clamping devices are not illustrated in the annexed drawings, since they are of a type known per se, and their deletion from the drawings renders the later easier to be understood. At any rate, such devices comprise, according to the conventional art (see U.S. Pat. No. 4,256,947), clamps each comprising two jaws at least one of which is movable between an opening position and a closed position and having a shape corresponding to that of the parts to be locked together. Each of the gates 17, 18 is mounted on carriages 20 with wheels 21 which are guided along longitudinal tracks 22 arranged on both sides of the line 2 and the welding station 1. Therefore, in the device according to the invention, the bulky and complicated fixed supporting structure which is provided in the known Robogate stations in order to support and guide the locating gates is completely eliminated. Thus, as clearly visible in FIG. 2, the bulk of the station is greatly decreased and the station is completely free from structures which can hinder the operation of the welding robots or the positioning thereof. Due to said feature, also, the size of each locating gate is greatly reduced with respect to the conventional size of locating gates provided in the Robogate systems of known type.

Still with reference to FIGS. 1, 2, locating gates 17, 18, due to their mounting on carriages 20 guided on tracks 22, are rapidly inerchangeable at the work area L of the welding station. In particular, each pair of gates 17, 18 is movable between the work position L and a waiting position which for gates 17, is the position indicated by W1 in FIG. 1 and for gates 18 is the position indicated by W2 also in FIG. 1.

As it can be seen in FIGS. 2–5, the guiding tracks 22 provided on both sides of the welding station have, at the work area L, separate portions 23 which are slidably mounted along a direction transverse of the longitudinal direction of line 2 with respect to fixed guides 24. Therefore, when a pair of locating gates 17 or 18 is at the work area L, such gates are movable between spaced apart inoperative positions (see FIG. 6) and relatively close operative position, in which the clamping devices carried by such gates may engage the various elements forming the body so as to lock the same in the proper assembling position relative to each other.

Figure 6:
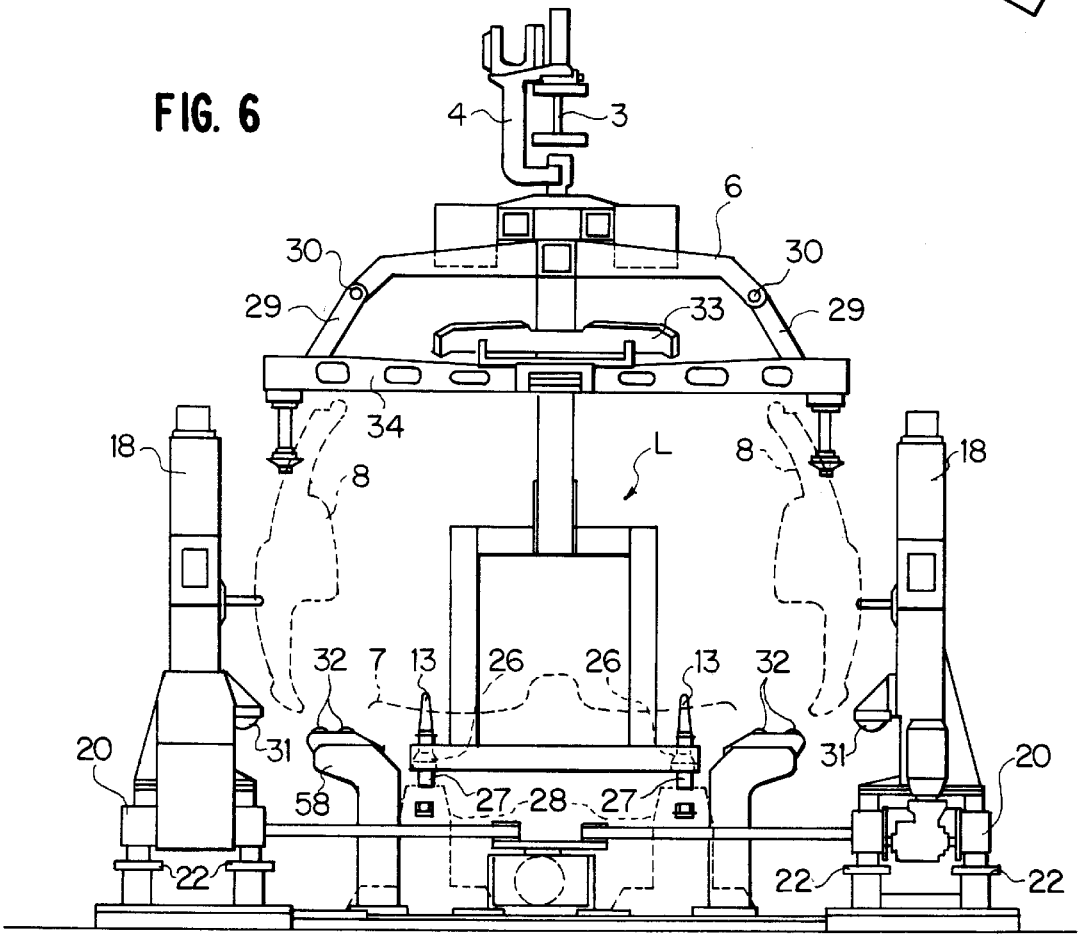
FIG. 6 is a cross-sectional view of the welding station in a first operative condition.
Figure 5:
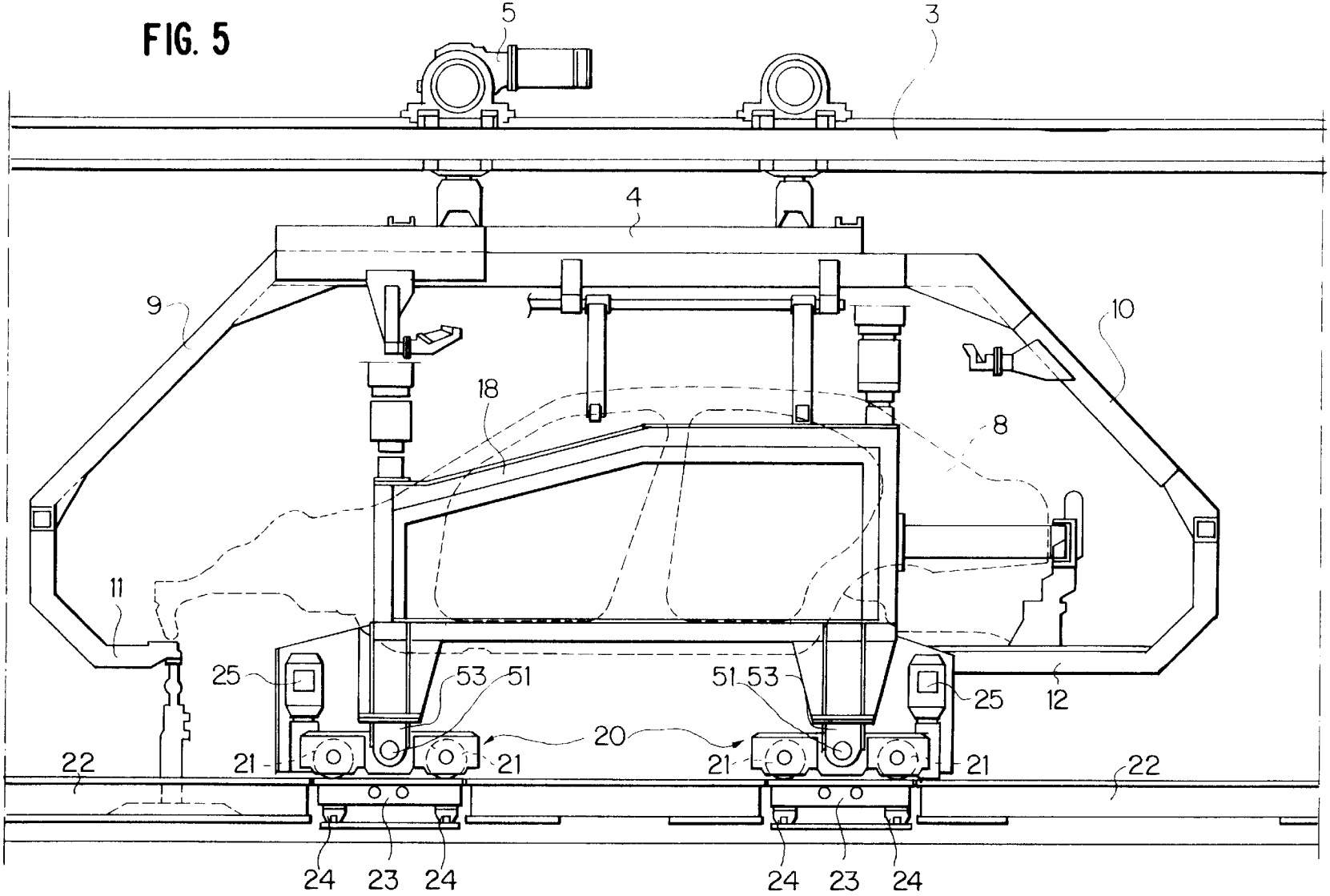
FIG. 5 is a view on an enlarged scale of a detail of FIG. 3.
Figure 7:
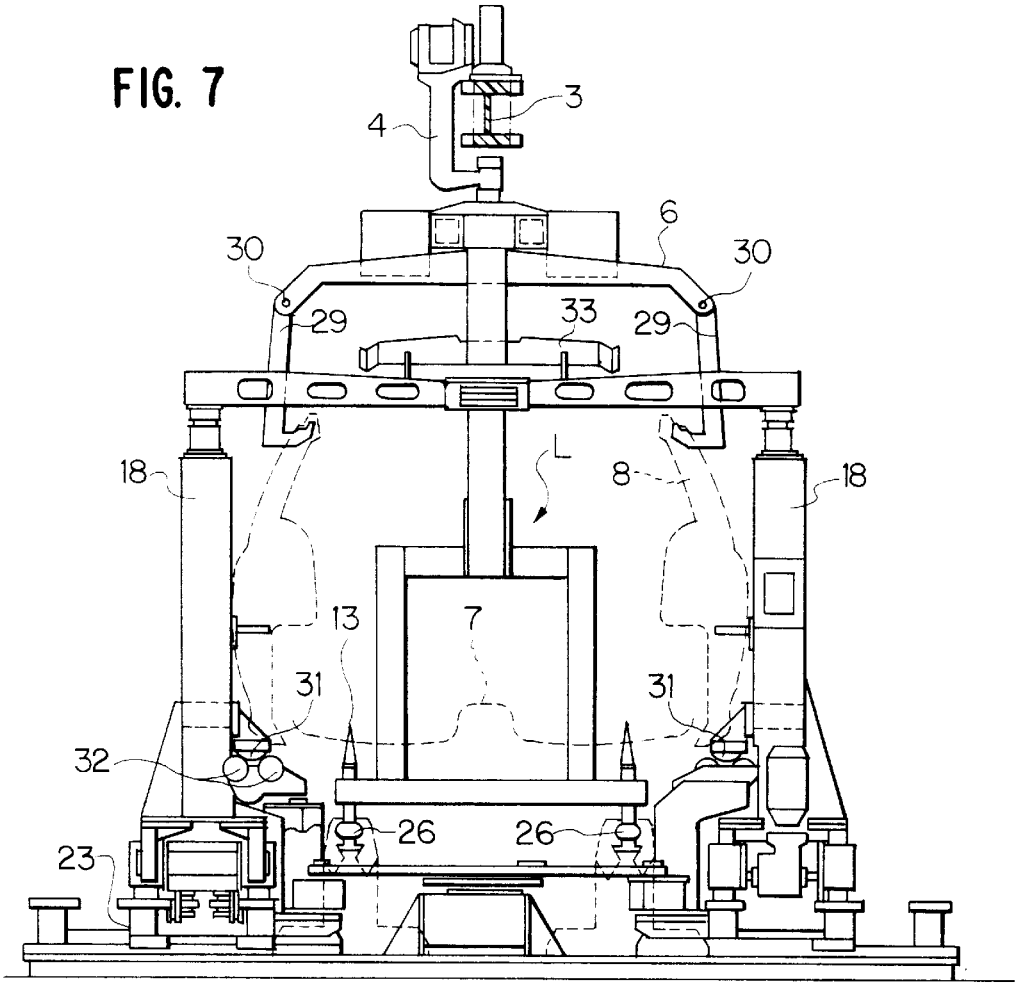
FIG. 7 is a cross-sectional view of the welding station in a second operative condition.

In FIG. 5, there are shown the motors 25 for driving carriages 20. Such motors are for example electric motors which can be fed in any way known in the art of powered carriages. As to the transverse movement of the guiding portions 23, it can be obtained by any transmission device of known type, for example a crank and connecting rod device (not illustrated). With reference to FIGS. 5, 6, 7, each hook 6 supports, as it has been indicated already, the bunch of the main elements which are to form the body of the motor-vehicle, specifically the floor panel 7 and the side portions 8. As it has also been indicated already, the floor panel 7 is supported by reference cones 13. As visible in FIG. 6, such cones are mounted in a floating way on swivels 26 carried by hook 6. Cones 13 have lower stems 27 which project downwardly from hook 6 and are held in a strictly determined position by locking clamps 28 provided at the work area L of the welding station in order to ensure precise positioning of floor panel 7.

Also with reference to FIGS. 6, 7, the two side portions 8 are suspended to pivoting arms 19 forming part of the structure of hook 6, which can be rotated around respective articulation axes 30 by any driving device, for example a motor reducer and a crank and connecting rod unit (not illustrated). Therefore, arms 29 can be displaced between first close positions (FIG. 7) and second opened positions (FIG. 6).

When hook 6 arrives at the work area L, arms 29 are in the first positions illustrated in FIG. 7. At the same time, the locating gates provided at the work area L (corresponding to the model of body to be welded) are still in their inoperative spaced apart positions illustrated in FIG. 6.

In such condition, the various elements forming the body are not yet connected to each other, but rather they are separate from each other, in a position close to that of final assembling (as illustrated in FIG. 7). Starting from such condition, arms 29 open until they arrive at the position illustrated in FIG. 6, so as to deliver the body portions 8 to the pair of locating gates (gates 18 in the case illustrated in FIG. 6) which are at the work area L. Once the condition illustrated in FIG. 6 is reached, the clamping devices carried by locating gates 18 are able to engage and support the body side portions 8. Thus, the pivoting arms 29 cease to fulfil the function of supporting the side portions 8, whereas the two locating gates 18 can be brought closer to each other in their operative positions (FIG. 7) by moving the track portions 23 tansversely.

The position of gates 18 in the operative condition illustrated in FIG. 7 is precisely defined by the engagement of reference rollers or balls 31 carried by the gates into corresponding seats defined by rollers 32, in the way which will be illustrated more in detail in the following.

When the locating gates arrive at the position illustrated in FIG. 7, the clamping devices mounted thereon lock the body side portions 8 onto the floor panel 7 in the proper assembling mutual position. At the same time, one or more robots 16 are used as manipulating robots in order to position on the two body side portions 8 upper connecting cross-members 33 provided for example on a rack mounted on the hook 6 for picking up by said robots. To this end, the robots 16 may be of any type adapted both to manipulating and welding, such robots being provided with a gripping head and a welding head, so that they can operate both as welding robot and as manipulating robots.

Also in order to ensure a proper positioning of the locating gates 18 during the welding operation, the gates are connected to each other at their upper parts by cross-members 34 whose ends are provided with pins 35 projecting downwardly which engage corresponding seats provided in the locating gates, as it will be illustrated in detain hereinafter.

Figure 9:
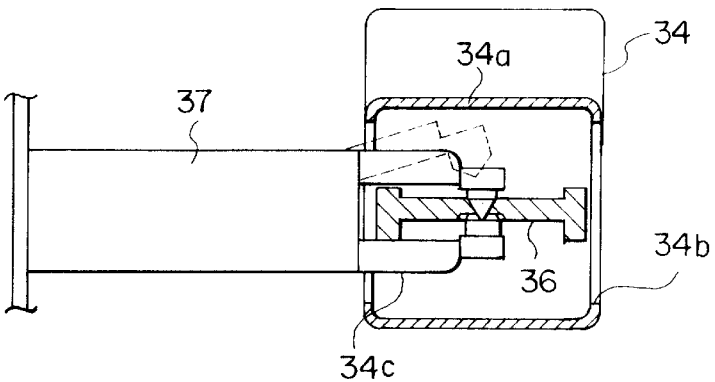
FIG. 9 is a cross-sectional view taken along line IX—IX of FIG. 8.
Figure 3:
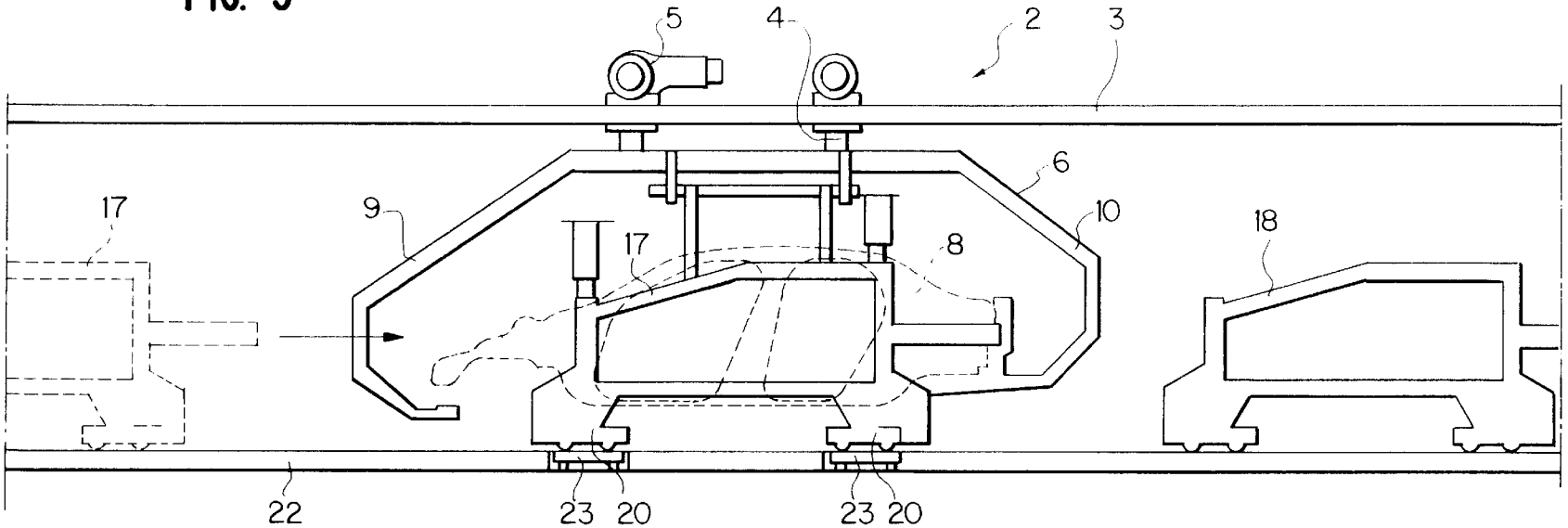
FIG. 3 is a side view on an enlarged scale of the device of FIG. 2.
Figure 8:
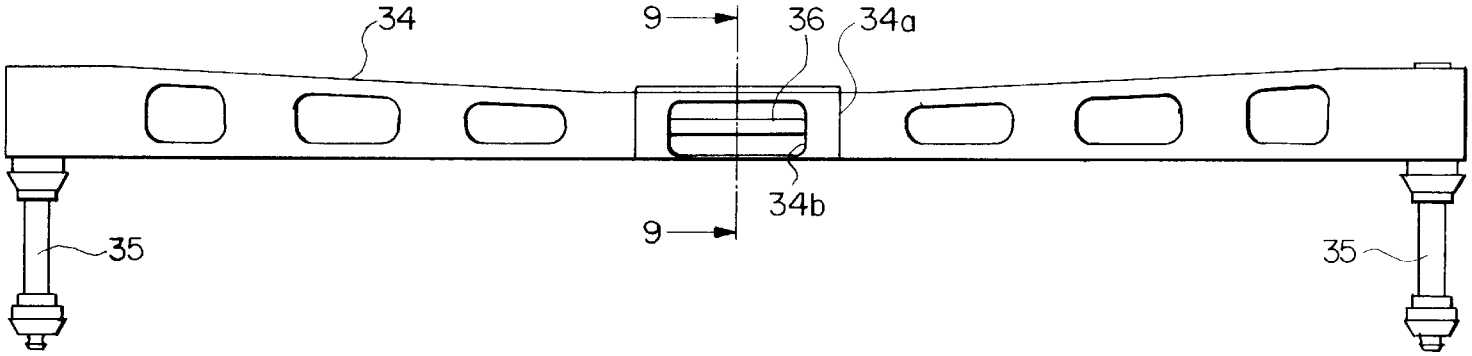
FIG. 8 is a view of an enlarged scale of a detail of FIGS. 6, 7.
Figure 10:
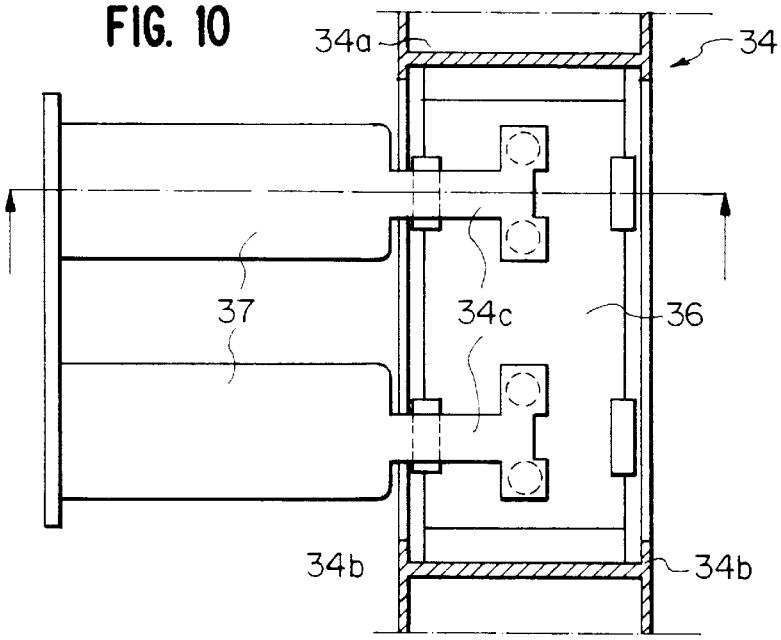
FIG. 10 is a cross-sectional view taken along line X—X of FIG. 9.

FIG. 8 shows one of the cross-members 34. This cross-member has a box-like sheet metal structure including a central portion 34a with an aperture 34b through which two clamps 34c (FIGS. 9, 10) may enter into the inner cavity of cross-member 34 and grasp a plate 36 welded to the structure of cross-member 34.

The two clamps 34c are carried by two beams 37 which are to be connected to the wrist of one of robots 16.

Figure 11:
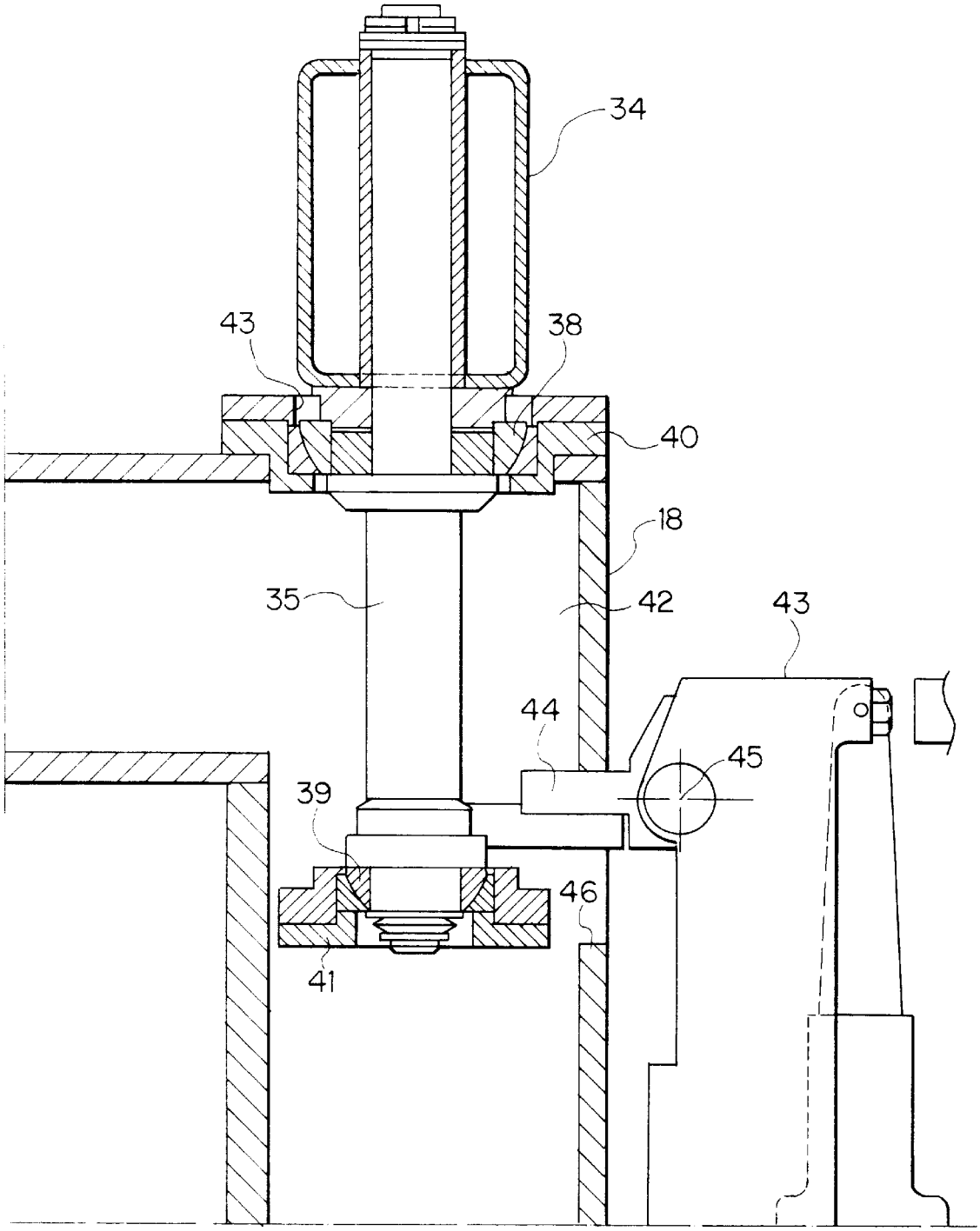
FIG. 11 is a view on an enlarged scale and in cross-section taken along line XI—XI of FIG. 7.

FIG. 11 shows the detail of one of the end pin 35 provided on cross-member 34. As illustrated, pin 35 has, at two axially spaced apart positions, two rings with spherical surfaces 38, 39 which are received in two seats of a corresponding shape provided in two elements 40, 41 forming part of the structure of the locating gate. Pin 35 enters into the inner cavity 42 of the gate through an aperture 43 provided on the upper surface thereof, until it comes in contact with said spherical rings 38, 39 against the corresponding seats. In this condition, pin 35 is locked in position by a locking device 43 comprising a jaw 44 pivoted around an axis 45 which is inserted through an aperture 46 of the gate 18 until it is engaged on a annular shoulder 47 formed on the lower end of pin 35. Thus, the two rings 38, 39 are axially pressed against their seats and the cross-member 34 is thus locked at each end on the respective gate 18.

Figure 12:
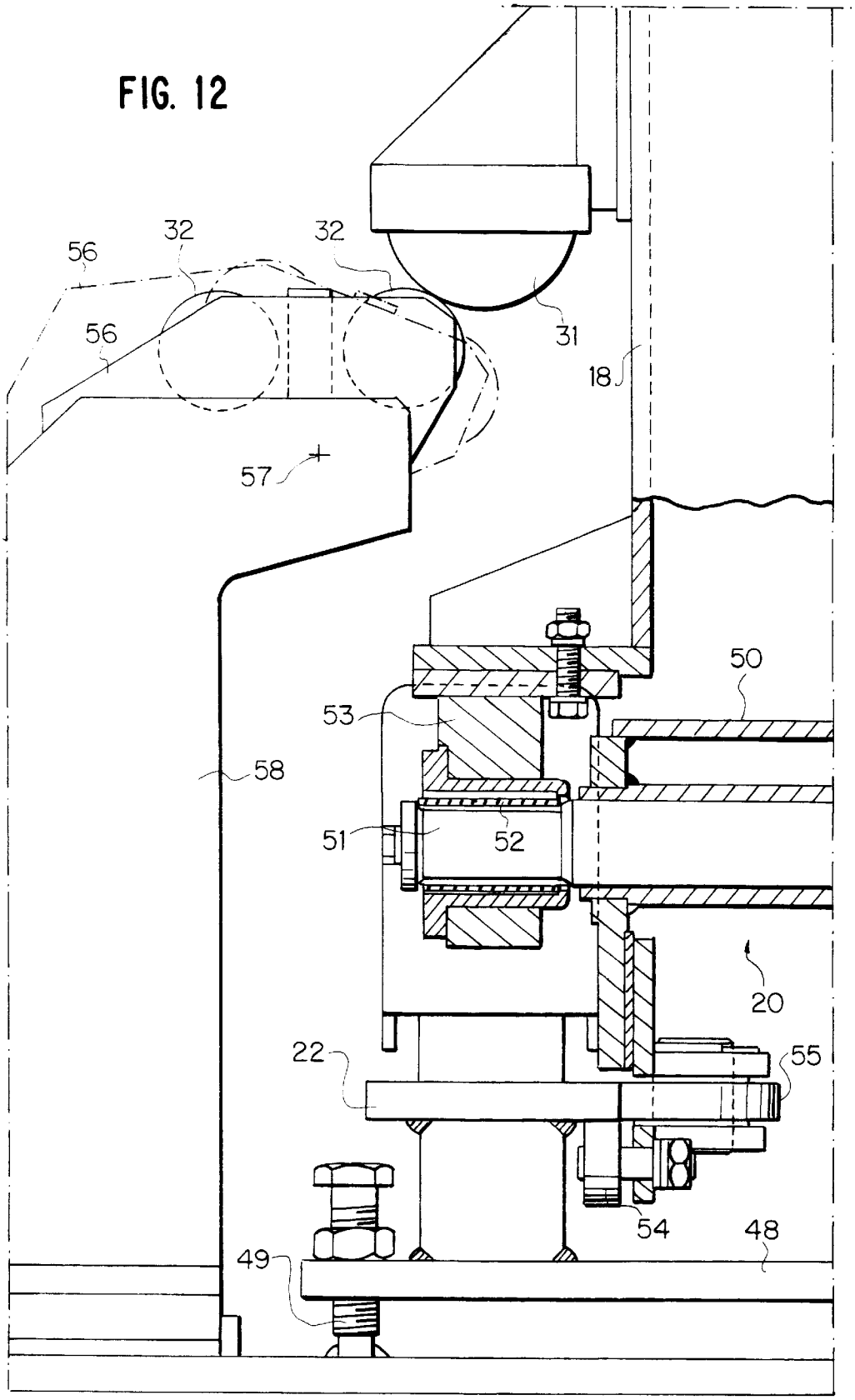
FIG. 12 is a view partially in cross-section and on an enlarged sale of a detail of FIGS. 6, 7.

With reference to FIG. 12, each track 22 is welded on a plane 48 which can be levelled by screws 49. The wheels 21 of the carriage 20 are rotatably mounted on a frame 50 which has a transverse pin 51 supporting the structure of the locking gate with the interposition of a ring of elastomeric material 52 between said pin 31 and an apertures support 53 projecting from the structure of gage 18 (see also FIG. 5). Therefore, the locating gate is able to have minor displacements along the vertical direction with respect to the frame 50 of the carriage 20.

FIG. 12 shows also lower and side guiding wheels 54, 55 which engage the lower and side surface of track 22.

FIG. 12 also shows on an enlarged scale the detail of the ball 31 which is to be received in the seat defined between two rollers 32 when the frame 18 arrives at its operative position. Rollers 32 are carried by a bracket 56 which is pivoted around an axis 57 to a fixed structure 58, so that when frame 18 is displaced towards its operative position, structure 56 is in the waiting position indicated with dotted lines until the wheel 31 comes into contact with wheels 32 causing support 56 to rotate until it arrives at the position illustrated with undotted line, in which frame 18 is slightly raised (this possibility being made possible by rubber bushes 52) and positioned properly for carrying out the welding operations.

Figure 4:
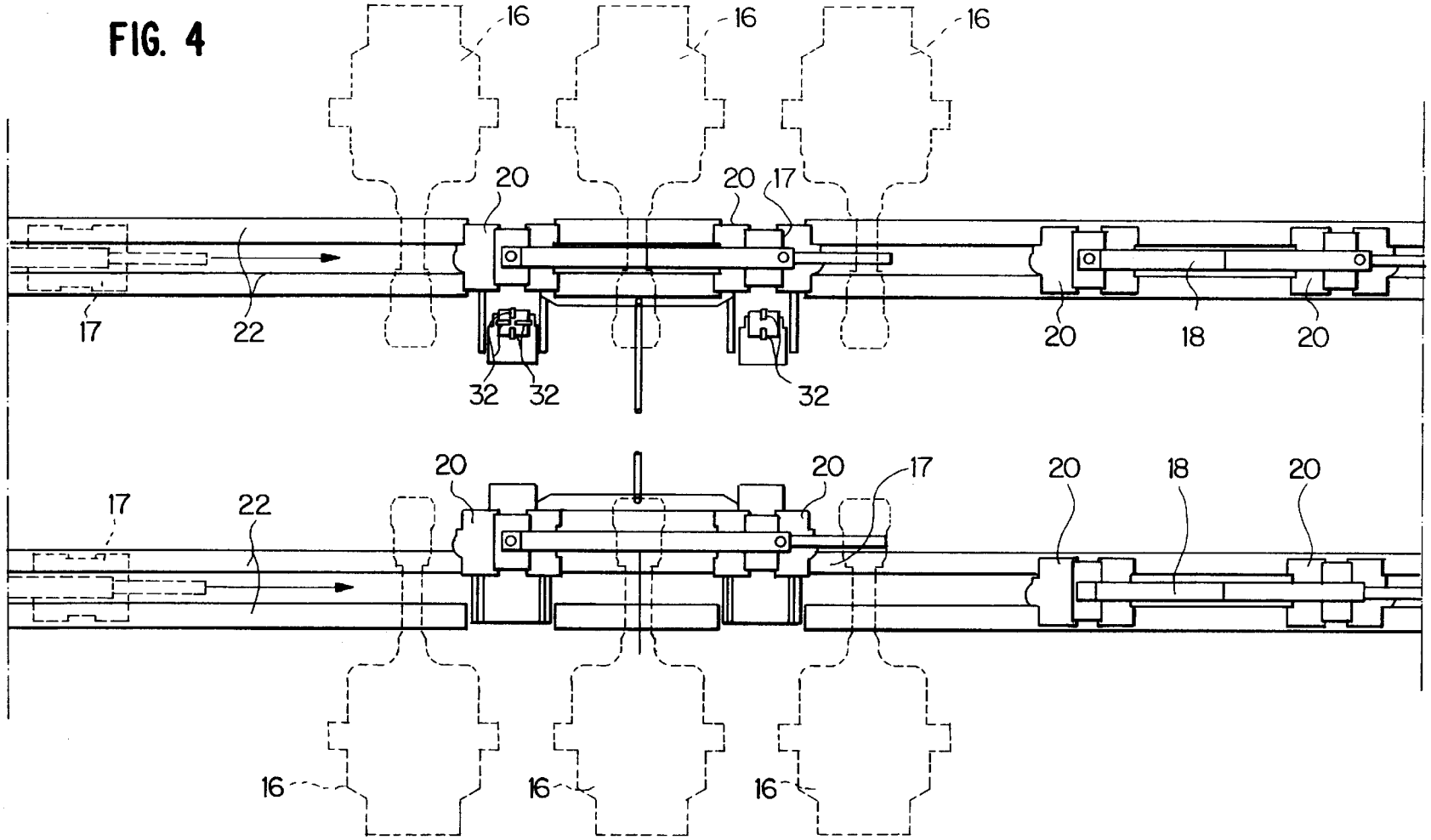
FIG. 4 is a plan view of the device of FIG. 3.

As visible in FIG. 4, for each locating gate there are provided two devices of the above described type. In one case, two rollers 32 are provided, arranged in a plane transverse to the longitudinal direction of the line, whereas for the other carriage of the gate there are provided four rollers 32 arranged according to a cross-like configuration, in such a case the roller 31 being replaced by a ball.

The operation of the above described device is as follows.

The welding station 1 receives in sequence hooks 6 carrying out the bunches of elements (floor panel and body side portions) which are to form the bodies to be welded. Such bunches are formed at stations A, B, C (FIG. 1) located upstream of the welding station. In the case of the illustrated example, welding station 1 is arranged to operate two different body nodes. However, it will be clearly apparent that the station may operate on more than two different models, provided that corresponding number of pairs of locating gates are provided. At the end of the welding operation of a body in the welding station at the work area L, line 2 is activated to bring the welded body towards the exit and to simultaneously let a new bunch to be welded get into the work area L. If the new bunch corresponds to a body of a model different from the model of the body which has just been welded, during the movement of line 2, also the powered carriages of the locating gates 17, 18 are activated to replace the pair of gates which are at the work area L. This can be made naturally once the two locating gates which were previously located at the work area have been displaced transversely to their spaced apart inoperative positions. When the two new gates arrive at the work area, they remain in their inoperative spaced apart positions. The pivoting arms 29 of the hook 6 which has just been arrived at the work area L are then opened to deliver the body side portions 8 of the bunch to the two locating gates. The clamping devices of the gates are activated to grasp and support the two body side portions 8, whereupon the two gates are displaced transversely to their close operative positions, in which the various clamping devices are able to locate the body side portions 8 with respect to the floor panel 7. At the same time, this floor panel is located in a precise position by locking the lower ends 27 of the reference cone 13 by jaws 28. Moreover, the precise position of the locating gates is ensured by the engagement of rollers or balls 31 on rollers 32 carried by the fixed structure 58, as it has been described above. Then, robots 16 which are used as manipulating robots pick up the upper cross-members 33 and locate them with the ends thereof in contact with the two body side portions 8. Also the manipulating robots pick up cross-members 34 halving the pins 35 and cause the same to engage the two locating gates so as to form a rigid reference cage-like structure for locking the various parts to be welded.

Then, the welding robots tan operate to perform a number of welding points on the body sufficient to ensure a stable geometry to the body itself. Once welding has been performed, cross-members 34 are removed and the locking devices of the locking gates are deactivated and the gates themselves are carried back to their inoperative spaced apart positions, living the welded body suspended to hook 6. The cycle of operations can then be repeated by introducing a new bunch to be welded.

As it is clearly apparent from the foregoing description, the device according to the invention keeps all the advantages which are typical of the Robogate system, i.e. a high flexibility of operation, which allows the welding station to operate on bodies even very different from each other; the possibility to introduce a new body module into production with very reduced setting up times and investments and an absolute uniformity of production in the bodies of a same type.

The device according to the invention is also characterised by further relevant advantages. Firstly, the tabbing operation which is conventionally provided upstream of the Robogate station in order to preassemble the body to be Welded, is completely eliminated. The production plant is therefore greatly simplified and has a lower cost. Furthermore, the bulky fixed structures provided in the conventional Robogate welding stations in order to support and guide the locating gates are also completely eliminated. As it has been described, each gate is movable independently from the other gates, which leaves a big space available for positioning the welding robots and gives a great flexibility in the design and installation, due to that the pitch distance between subsequent gates on the lines is not fixed nor constant. As it has also been illustrated, the device ensures with absolute precision the proper positioning of the various parts to-be welded and the locating gates, which allows a very high quality of production.

Moreover, the structure of the locating gates is dramatically simplified and reduced in size with respect to that of the locating gates of the conventional Robogate stations.

Figure 13:
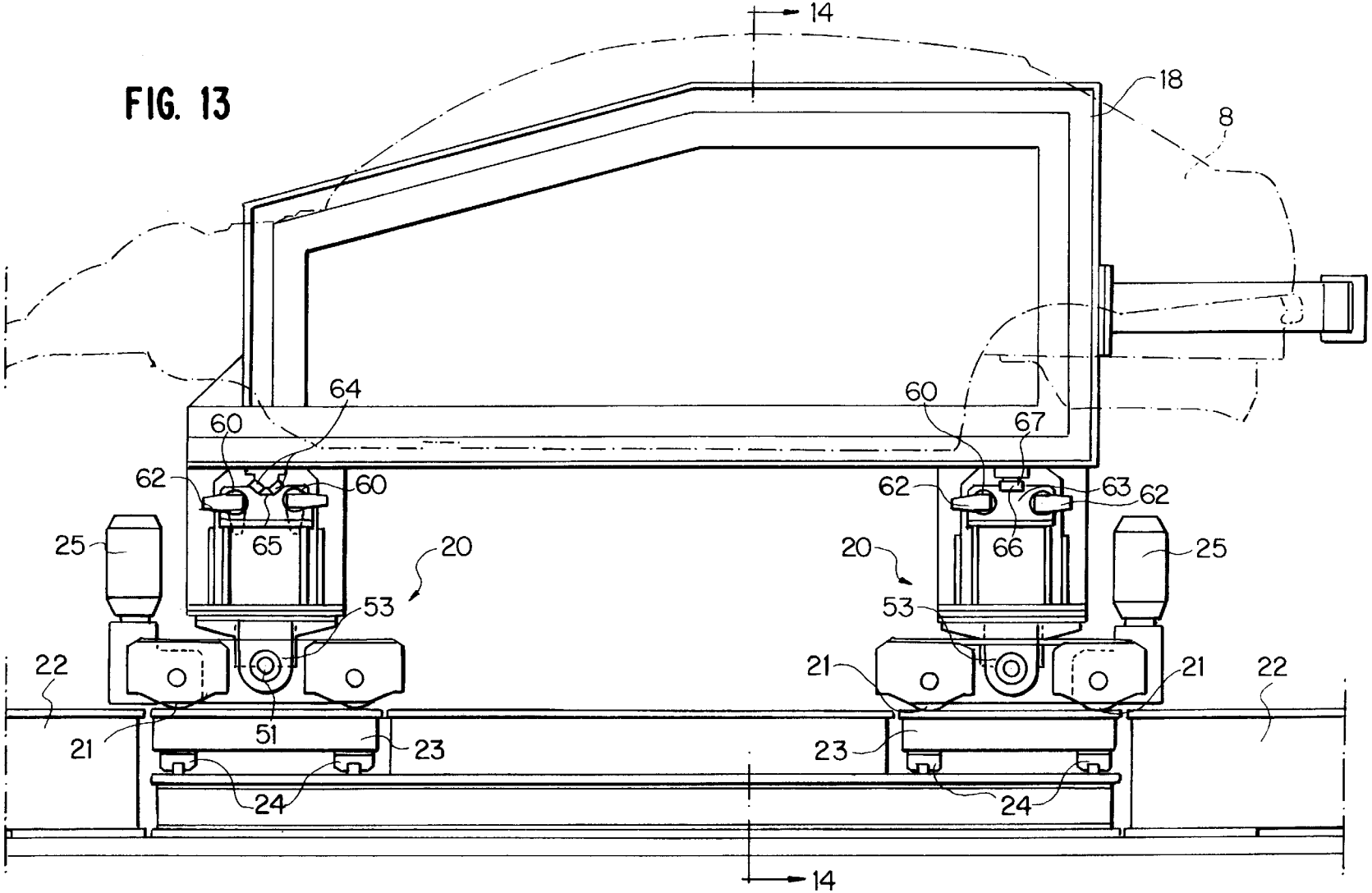
FIG. 13 shows a variant of FIG. 5.
Figure 14:
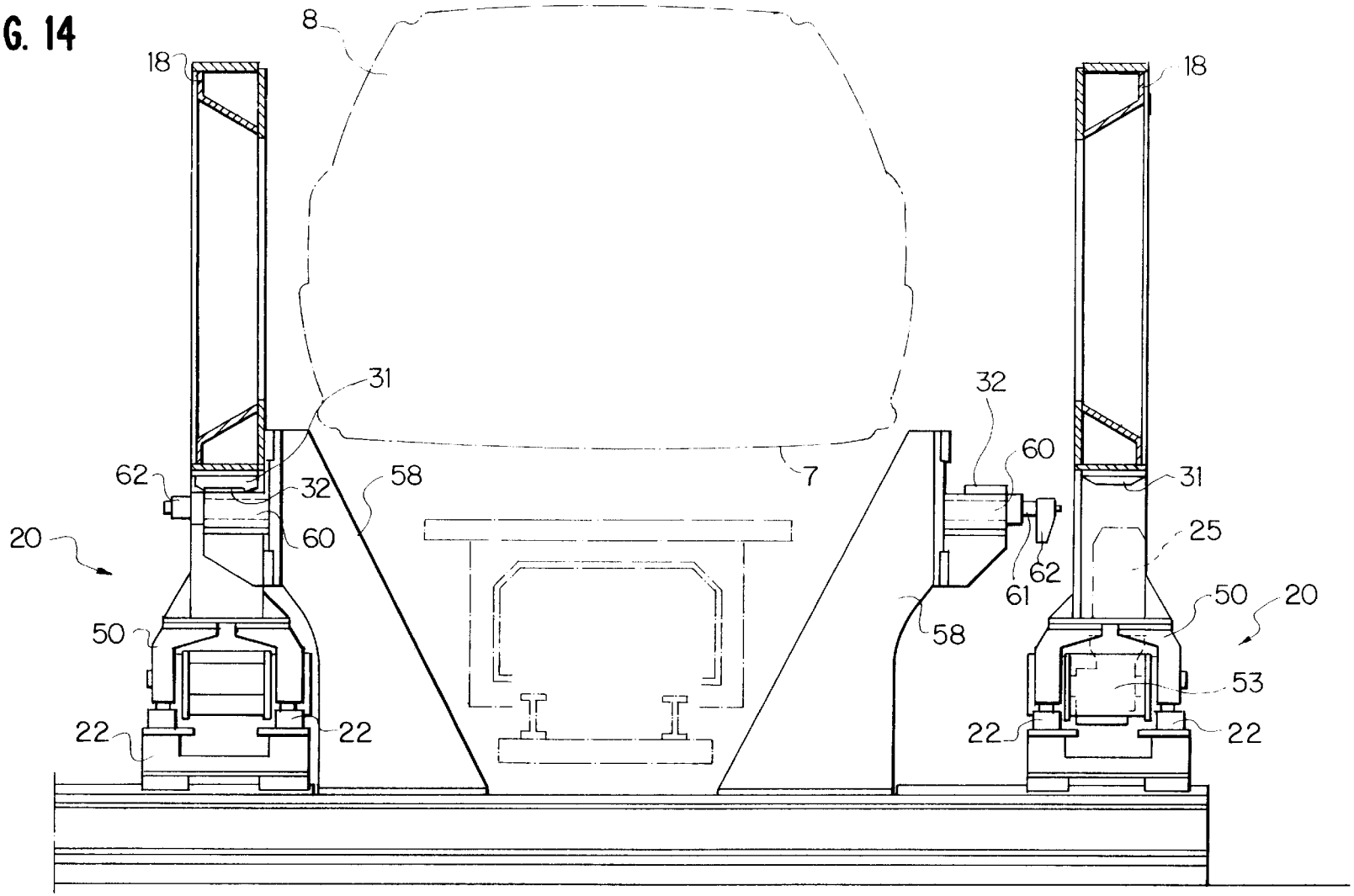
FIG. 14 is a cross-sectional view taken along line XIV—XIV of FIG. 13.

FIGS. 13 and 14 show a variant of the device according to the invention. In these figures, parts identical or similar to those previously described are indicated with the same reference numerals.

FIG. 13 is a view similar to that of FIG. 5 in which, for simplicity of illustration, the overhead conveyor (rail 3 and trolley 4), as well as the hook 6 have been omitted. Also the support structure of the floor panel 7 is shown in FIG. 14 in a simplified form.

This variant differs from the embodiment described in the foregoing basically because it eliminates the need of using the upper cross-members 34 which provides a simpler construction and the advantage of reducing the bulk along the transverse direction in the upper portion of the welding station 1.

This simplification is obtained due to that the locating gates 18 (or 17), are not connected to each other at their upper portions, but are rigidly connected, at the portions thereof located above the carriages 20, to the associated fixed structures 58. To this effect, each structure 58 supports respective powered locking actuators 60 of a conventional type, for example fluid actuators or equivalents, each having a movable arm 61 with an engaging end member 62 adapted to engage through an aperture 63 formed above the corresponding carriage 20 of the locating gate 18. The engaging end member 62 are rotatable, for example by 90 degrees, between the lowered rest position shown in the right portion of FIG. 14 and the raised operative position shown in the left portion of the same figure and in FIG. 13.

Furthermore, in the area of the actuators 60, the fixed structures 58 situated close to the forward portion of each gate 18, have a pair of opposed rollers 64 with inclined axes adapted to cooperate with a mating surface 65 of the structure of the forward carriage 20, whereas close to the rearward portion of each gate 18 the structures 58 have a roller 67 with a vertical axis adapted to cooperate with a mating surface 66 of the structure of the rearward carriage 20.

In operation, when the two locating gates 18 are moved transversely from the spaced apart inoperative positions (shown in the right portion of FIG. 14) to the relatively close operative positions (shown in the left portion of the same figure and in FIG. 13), the powered actuators 60 are activated so as to clamp and rigidly lock, on the outer sides of the corresponding apertures 63, the locating gates 18 with respect to the fixed structures 58. During the approaching stage, rollers 64 and 67 cooperate with the respective surfaces 65 and 66 so as to take up the elastic deformation under load of the elements 52 of elastomer material, by slightly raising the gates 18, in a manner similar to what has been described with reference to the previous embodiment.

Thus, the precise and rigid positioning of the locating gates 18 is ensured without the use of the upper cross-members.

Naturally, the principle of the invention remaining the same, the construction details and the embodiments may widely vary with respect to what has been described and illustrated purely by way of example, without departing from the scope of the present invention.

I claim:

1. Device for spot welding of structures formed of pressed sheet metal elements, particularly motor-vehicle bodies, comprising:

a welding station provided with programmable automatic welding means, a line for feeding the structures to be welded in sequence to the welding station, at least two pairs of locating gates provided at the welding station so as to be rapidly interchangeable at a work area, said gates carrying devices for locking the elements forming the structure to be welded in the proper assembling position relative to each other, the gates of each pair being provided with locking devices adapted to a respective type of structure to be welded, said pairs of gates being slidably mounted longitudinally on both sides of said line at the welding station, so that they are rapidly movable between a waiting area and said work area, said gates of each pair being also movable transversely of said line, when they are at the work area, between spaced apart inoperative positions and relatively close operative positions, in which the locking devices carried by said gates engage the structure which is at the work area, wherein:

a) said locating gates are mounted on powered carriages which are guided along two tracks on both sides of said line, b) said line comprises support means for supporting the various elements forming each structure to be welded in a position close to the final assembling position, but with said elements being separate from each other, c) said guiding tracks have been separate portions which are movable transversely of the longitudinal direction of said line at the work area, for displacing the two locating gates which are at the work area between their spaced apart inoperative positions and their relatively close operative positions, d) said support means comprises movable parts for supporting two side portions of the structure to be welded, said parts being movable between a first position, for travel along said line, in which said side portions are close to each other, and a second position, in which said side portions are spaced apart from each other and are adjacent to two locating gates provided in their spaced apart inoperative positions, so as to allow said side portions to be picked up by said locking devices of said locating gates and then to allow the various elements forming the structure to be welded to be locked as a result of the displacement of the locating gates into their operative positions.

2. Device according to claim 1, wherein said line comprises an overhead conveyor and said support means comprises a hook for supporting and suspending the various elements of a structure to be welded.

3. Device according to claim 2, when said hook is provided with floating reference pins for positioning a floor panel forming part of the structure to be welded, said floating pins having their lower ends which can be locked in a precise position by locking jaws arranged at the work area.

4. Device according to claim 3, wherein each locating gate is provided with a pair of carriages, said locating gate being supported by transverse pins projecting from the frame of said carriages with the interposition of bushes of elastomeric material, which allow minor vertical movements of the locating gate with respect to said carriages.

5. Device according to claim 4, wherein at the work area there are provided reference rollers carried by a structure which is pivotally mounted on a fixed structure, said rollers being adapted to define a reference seat for an abutment element carried by each locating gate, so as to locate the locating gate in a precise position when it reaches its operative position at the work area.

6. Device according to claim 5, wherein said device comprises cross-members connecting the two locating gates in their operative positions, said programmable welding means being robots which are also adapted to pick up said connecting cross-members from a rest area and to mount the same on the two locating gates when the latter are in their operative positions, each of said cross-members being provided at its ends with two lower pins for connection to the respective locating gates.

7. Device according to claim 3, wherein it also comprises actuator means for rigidly locking the locating gates mounted on the associated powered carriages, onto a fixed structure, as a result of the displacement of said gates transversely of said line from said inoperative spaced apart positions to their operative relatively close position, reference rollers being also provided, carried by said fixed structure and adapted to cooperate with corresponding engaging surfaces associated with said locating gates.

*8. Device for spot welding of structures formed of pressed sheet metal elements, particularly motor-vehicle bodies, comprising:*

*a welding station provided with programmable automatic welding means,*

*a line for feeding structures to be welded in sequence to the welding station,*

*at least to pairs of locating gates provided at the welding station so as to be rapidly interchangeable at a work area, said gates carrying devices for locking the elements forming the structure to be welded in the proper assembling position relative to each other, the gates of each pair being provided with locking devices adapted to a respective type of structure to be welded, said pairs of gates being slidably mounted longitudinally on both sides of said line at the welding station, so that they are rapidly movable between a waiting area and said work area, said gates of each pair being also movable transversely of said line, when they are at the work area, between spaced apart inoperative positions and relatively close operative positions, in which the locking devices carried by said gates engage the structure which is at the work area,*

*wherein:*

*a) said locating gates are mounted on lower powered carriages which are guided along two tracks provided on the floor of said station on both sides of said line,*

*b) said guiding tracks have separate portions which are movable transversely of the longitudinal direction of said line at the work area, for displacing the two locating gates which are at the work area between their spaced apart inoperative positions and their relatively close operative positions.*

* * * * *